United States Patent [19]

Park

[11] Patent Number: 5,427,828

[45] Date of Patent: Jun. 27, 1995

[54] CHOLESTERIC LIQUID CRYSTAL AND POLYMER DISPERSED LIQUID CRYSTAL DISPLAY DEVICE UTILIZING THE SAME

[75] Inventor: Jae G. Park, Kyunggi, Rep. of Korea

[73] Assignee: Samsung Electron Devices Co., Ltd., Rep. of Korea

[21] Appl. No.: 124,611

[22] Filed: Sep. 20, 1993

[30] Foreign Application Priority Data

Sep. 24, 1992 [KR] Rep. of Korea ............... 92-17423

[51] Int. Cl.$^6$ .............................................. C09K 19/50
[52] U.S. Cl. ......................................... 428/1; 359/75; 359/78
[58] Field of Search ............. 428/1; 359/75, 78, 77; 526/292.2

[56] References Cited

U.S. PATENT DOCUMENTS 3,930,716 1/1976 Robert ................................ 359/76

FOREIGN PATENT DOCUMENTS 61-91627 5/1986 Japan .
1221285 9/1989 Japan .

OTHER PUBLICATIONS

J. W. Doane et al. (1991) IEEE 8, 175–178 "Current Trends in Polymer dispersed liquid Crystals".
D. K. Yang et al. (1991) IEEE 8, 49–52 "Cholesteric Liquid Crystal/Polymer Gel dispersion bistable at zero field".
R. T. Morrison and R. N. Boyd, Organic Chemistry, 3rd Ed Allyn and Bacon, Inc. Boston, 1973, p. 21.

*Primary Examiner*—Mark Nagumo
*Attorney, Agent, or Firm*—Steinberg, Raskin & Davidson

[57] ABSTRACT

A cholesteric liquid crystal compound having the following general formula (I), and a polymric cholesteric liquid crystal compound formd by polymerization thereof and a polymer dispersed liquid crystal display device having an improved contrast and driving voltage which is prepared by coating surfaces of two glass substrate plates with the above liquid crystal or the polymer liqui crystal formed by polymerization thereof in a thickness of 50–1000 Å, injecting a conventional nematic liquid crystal and a polymer gel precursor into a space formed between the two glass plates and subjecting them to the polymerization under ultraviolet light radiation are disclosed.

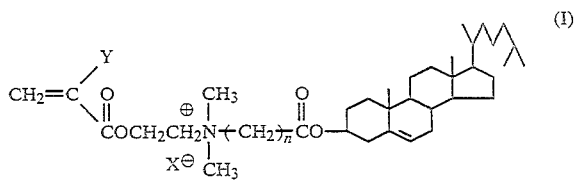

wherein
Y represents hydrogen, a hydrocarbon radical having one or more carbon atoms, and optionally containing one or more hetero atoms selected from the group consisting of oxygen, sulfur and nitrogen,
X represents a halogen atom, and
n denotes an integer of one or more.

5 Claims, 2 Drawing Sheets

CHOLESTERIC LIQUID CRYSTAL AND POLYMER DISPERSED LIQUID CRYSTAL DISPLAY DEVICE UTILIZING THE SAME

BACKGROUND OF THE INVENTION

FIELD OF THE INVENTION

The present invention relates to a cholesteric liquid crystal having amphiphilic properties in the polymer liquid crystal dispersed system and a polymer dispersed liquid crystal display device showing greatly improved properties of the dispersion system, particularly memory function and contrast, by utilizing the said cholesteric liquid crystal as an agent for treating the surface of transparent electrodes and phase transition inducers in liquid crystal cells.

INFORMATION DISCLOSURE STATEMENT

Liquid crystal materials have an intrinsic property for arrangement in a certain direction by external stimulation, for example, electric field, magnetic field, mechanical force, etc., and therefore, have been widely used in various display devices in a plate form. Such property originates from a birefringency property of liquid crystal molecules. Birefringency property means that the physical properties of the liquid crystal vary with the direction of molecular arrangement. Contrary to a conventional Braun tube, the liquid crystal display device is light and has a very low driving voltage and a high contrast.

In order to use the liquid crystal in a plate display device, a polarized light must be used and therefore a polarizing plate is necessarily required. Accordingly, to remove heat by absorption of light other than polarized light, a cooling apparatus is also required. The most important fact is that the treatment for early orientation of liquid crystal on the surface of the glass electrode is needed.

Such a series of pre-treatment procedures makes the preparation of liquid crystal cells as a display device uneconomical and causes a deterioration of display quality and an increase of poor quality goods.

To overcome the above described problems of the prior art liquid crystal display devices, many studies have recently been extensively and actively made for the purpose of utilizing as display device a polymer liquid crystal dispersed system wherein a liquid crystal is dispersed in a high molecular weight resin.

When low molecular weight liquid crystals are mixed with and polymerized with a high molecular weight precursor, with the increase of molecular weight the phase separation of liquid crystal from high molecular weight resin occurs and the low molecular weight liquid crystal is then dispersed in the high molecular weight matrix in the form of drops. Under such condition, if the voltage is not applied to a glass electrode in a liquid crystal cell, the light is scattered to make the liquid crystal cell opaque when the light passes through high molecular weight resin, since the refractive index of liquid crystal in the liquid crystal drops differs for each drop.

However, when the voltage is applied to the electrode, liquid crystals in the liquid crystal drops are arranged in the direction of the electrical field and thus the light passes through the polymeric resin without scattering to maintain the liquid crystal cell in a transparent state. When the above scattering-transmission mode is utilized in the liquid crystal cell, contrary to the prior art liquid crystal cell, both the polarizing plate and the cooling apparatus are not necessary. In such case, the greatest advantage is that since no treatment for the orientation of liquid crystal is needed, the procedure for preparing the liquid crystal cell is simple and economical and can reduce the amount of poor quality goods. However, this has some disadvantages in that the driving voltage is very high and the contrast of liquid crystal cell is lowered due to some transmitted light when the voltage is not applied.

Therefore, an object of the present invention is to provide a cholesteric liquid crystal which does not have the above described problems involved in the prior liquid crystal cell.

Another object of the present invention is to provide a polymerized cholesteric liquid crystal compound prepared from the polymerization of the cholesteric liquid crystal compound of the invention.

Still another object of the present invention is to provide a liquid crystal display device showing greatly improved properties, particularly a memory function and a contrast.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description below which describe the preferred embodiment in addition to the scope of the invention defined by the claims considered in conjunction with the accompanying drawings.

SUMMARY OF THE INVENTION

For the purpose of summarizing the invention, the present invention relates to a cholesteric liquid crystal compound showing amphiphilic properties in the polymer liquid crystal dispersed system, a polymerized cholesteric liquid crystal compound prepared from the cholesteric liquid crystal compound and a polymer dispersed liquid crystal display device utilizing the said cholesteric liquid crystal compound.

The present invention relates to a cholesteric liquid crystal compound having the following general formula (I):

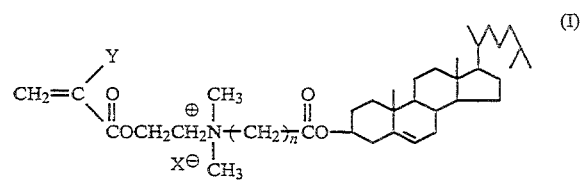

wherein
- Y represents hydrogen, a hydrocarbon radical having one or more carbon atoms, and optionally containing one or more hetero atoms selected from the group consisting of oxygen, sulfur and nitrogen,
- X represents a halogen atom, for example, Cl, Br, I and F, and
- n denotes an integer of one or more.

The present invention also relates to a polymerized cholesteric liquid crystal compound having the following general formula (II) which is prepared from polymerization of the cholesteric liquid crystal compound of the above formula (I):

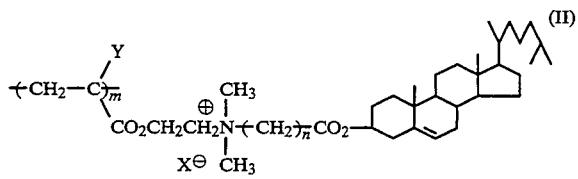

wherein
- Y represents hydrogen, a hydrocarbon radical having one or more carbon atoms, and optionally containing one or more hetero atoms selected from the group consisting of oxygen, sulfur and nitrogen,
- X represents a halogen atom, for example, Cl, Br, I and F, and
- n denotes an integer of one or more and m denotes an integer from 10–200.

In addition, the present invention relates to a polymer dispersed liquid crystal display device prepared by applying the cholesteric liquid crystal compound of formula (I) or the polymerized cholesteric liquid crystal compound of formula (II), as defined above, to the surface of a glass electrode to form a film having a thickness of 50–1000 Å, injecting a nematic liquid crystal and a precursor of polymer gel between substrate plates and then subjecting them to the ultraviolet light for polymerization.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiments disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

These and other objects, features and advantages of the present invention will become more apparent upon a reading of the following detailed specification and drawings, in which.

DETAILED DESCRIPTION OF PREFERRED EMBODIMENTS

Figure 1:
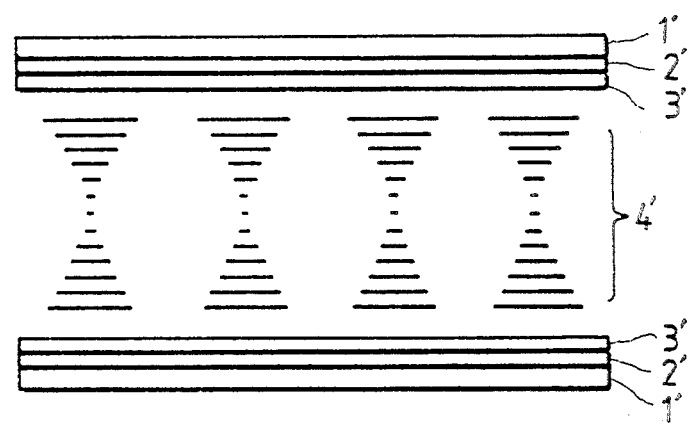
FIG. 1 is a cross sectional view of a prior art polymer dispersed liquid crystal display device using the mixture of nematic liquid crystal and cholesteric liquid crystal.

The present inventors have extensively researched for a long period to develop the polymer-liquid crystal dispersed system, useful in a display device, which can improve the low contrast and high driving voltage provided by the prior art liquid crystal system and particularly can make a simple driving manner utilizing the memory function possible. As a result of this, we have identified that an amphiphilic cholesteric liquid crystal having a special structure is suitable for such purpose and thus have completed the present invention.

Accordingly, the present invention is to provide a cholesteric liquid crystal compound having the following general formula (I).

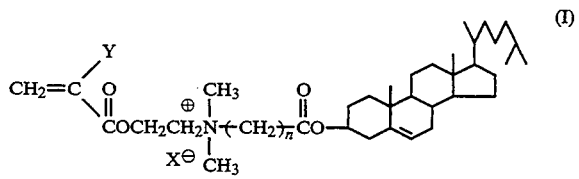

wherein
- Y represents hydrogen, a hydrocarbon radical having one or more carbon atoms, and optionally containing one or more hetero atoms selected from the group consisting of oxygen, sulfur and nitrogen,
- X represents a halogen atom, for example, Cl, Br, I and F, and
- n denotes an integer of one or more.

The present invention also provides a polymerized cholesteric liquid crystal compound having the following general formula (II) which is prepared from polymerization of the cholesteric liquid crystal compound:

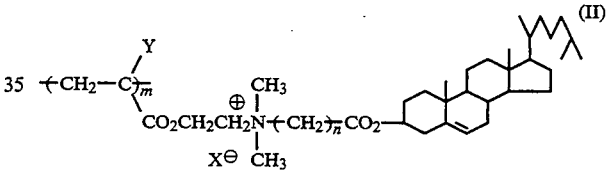

wherein
- Y represents hydrogen, a hydrocarbon radical having one or more carbon atoms and optionally containing one or more hetero atoms selected from the group consisting of oxygen, sulfur and nitrogen,
- X represents a halogen atom, for example, Cl, Br, I and F, and
- n denotes an integer of one or more and m denotes an integer from 10–200.

In addition, the present invention relates to a polymer dispersed liquid crystal display device prepared by applying the cholesteric liquid compound of the above general formula (I) or the polymerized cholesteric liquid crystal compound of the above general formula (II) to the surface of a glass electrode to form a film having thickness of 50–1000 Å, injecting a nematic liquid crystal and a precursor of polymer gel between substrate plates and then subjecting them to ultraviolet light for polymerization.

In the present invention, the liquid crystal precursor of the general formula (I) is characterized by an amphiphilic molecule which contains both a hydrophobic cholesterol group (tail part) having very low hydrophilic property and a quaternary ammonium salt group (head part) having very high hydrophilic property in the same molecule. Further, the liquid crystal compound of the formula (I) is characterized by a double bond contained in the hydrophilic site (head part) of the molecular structure, which can be polymerized by a free radical initiator or ultraviolet light.

The liquid crystal precursor of the formula (I) as defined above can be prepared, for example, by the following procedures. Specifically, one mole of cholesterol and one mole of 11-bromoundecanoic acid are dissolved in toluene in a reaction vessel equipped with a condenser and an apparatus for removing water generated during the reaction and then are reacted for 20 to 30 hours while slowly refluxing the toluene. After the reaction ends, toluene is removed by a rotary evaporator and the resulting product is recrystallized to obtain the white intermediate which is then reacted with 0.5 mole of N, N'-dimethylaminoethyl methacrylate and a small amount of hydroquinone as a polymerization inhibitor in acetonitrile solvent for 20 to 30 hours under reflux.

After the reaction is completed, the solvent is removed under reduced pressure and the resulting white solid is dissolved in chloroform and then purified by silica gel chromatography to prepare the liquid crystal compound of formula (I) having a high purity.

The amphiphilic molecule such as the liquid crystal precursor of formula (I) according to the present invention has the property of forming bilayer structure by gathering hydrophilic head part and hydrophobic tail part in separate groups in order to have a thermodynamically stable structure when the molecule is dissolved in water. Thus, to form a thin film of the cholesteric liquid crystal precursor of the formula (I) a very clean glass surface is first washed with distilled water and water is coated on the glass surface in a thickness of 1–5 $\mu$m.

Then, 50 to 100 mg of the amphiphilic liquid crystal precursor of the formula (I) is dissolved in 5 ml of diethyl ether and the resulting solution is slowly applied dropwise to the glass surface to form the ether coating layer on the water layer. After ether is completely evaporated from the coated glass at normal temperature over about 2 to 3 hours, the liquid crystal precursors which form the film on the water layer of the glass surface is subjected to the radiation of ultraviolet light of 365 nm to prepare a high polymeric liquid crystal compound. In this procedure, the light intensity is preferably 10–100-J/cm$^2$ and the light radiation time is preferably 30 minutes to 2 hours. Water remaining on the glass surface is rapidly frozen at approximately $-20°$ to $-30°$ C. so as not to alter the arrangement of liquid crystal precursor on the water surface and is then evaporated under high vacuum. The thickness of the liquid crystal layer can be controlled as required by repeatedly carrying out such procedures.

Two glass plates prepared as described above are assembled with a uniform thickness by using a spacer to form a cell. Into the space formed between two plates of the cell a liquid crystal mixture of a nematic liquid crystal and a monomer capable of forming polymer gel by polymerization is injected utilizing capillary action. Thereafter, the cell is polymerized with ultraviolet light of 365 nm to obtain a finished liquid crystal cell the surface of which is treated with the cholesteric liquid crystal.

The liquid crystal cell of the present invention will now be illustrated in greater detail by referring to the accompanying drawings.

As depicted in FIG. 1, in the prior art liquid crystal cell a ITO transparent electrode 2' is arranged at the inside of each of two glass plates 1' and an orientation membrane 3' is loaded on the electrode 2 to form a glass substrate plate. Then, between two glass substrate plates thus prepared the nematic liquid crystal and a little cholesteric liquid crystal and polymer gel are injected together to prepare the polymer dispersed liquid crystal display device. Accordingly, since the nematic liquid crystal has a cholesteric texture (or focalconic texture) 4' through the whole cell, the prior art liquid crystal cell has a disadvantage of high driving voltage.

Figure 2:
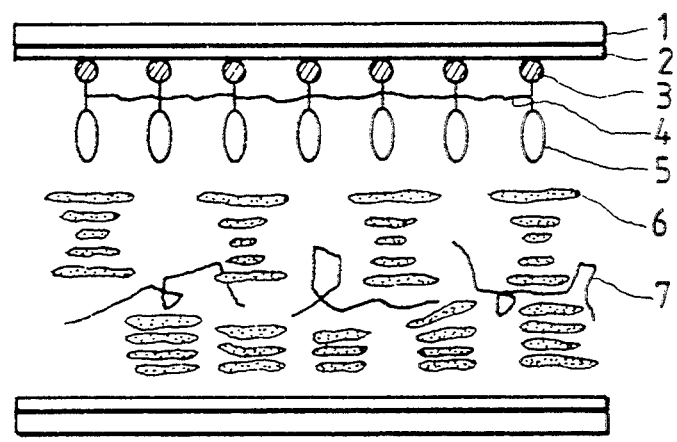
FIG. 2 is a schematic view showing the structure of a liquid crystal cell the surface of which is treated with a cholesteric liquid crystal according to the present invention.

However, according to the present invention, as depicted in FIG. 2, the amphiphilic cholesteric liquid crystals are coated onto both ITO transparent electrode-loaded glass substrate plates 1,1 so that the amphiphilic cholesteric liquid crystal is readily dissolved in water due to the presence of a hydrophilic group to make the control of LB thin layer formation easy, and therefore, the hydrophilic part 3 of the polymerized cholesteric liquid crystal 4 is present only in contact with the surface of ITO transparent electrode 2 and the hydrophobic part 5 of liquid crystal 4 is contiguous to the nematic liquid crystal molecule 6 and the polymer gel 7.

Figure 3:
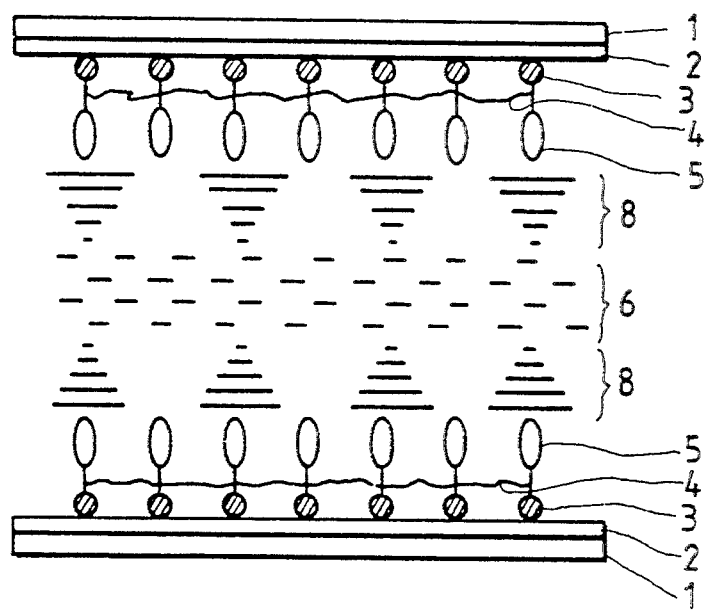
FIG. 3 is a detailed cross sectional view of the liquid crystal cell the surface of which is treated with a cholesteric liquid crystal according to the present invention.

In this manner, as depicted in FIG. 3, the focalconic texture 8 is formed only on the surface of the cell electrode 2 and the nematic liquid crystal 6 is present in the center of the cell. Accordingly, in the liquid crystal cell according to the present invention the driving voltage is lowered on the nematic level and the scattering property(contrast) is improved as in the focalconic texture.

The liquid crystal cell of the present invention as prepared above drastically improves the driving voltage and further has an effect of making a simple driving manner utilizing the memory function possible.

The present invention will be more specifically illustrated by the following examples. However, these examples are not intended to restrict the scope of the present invention in any manner.

EXAMPLE 1

386.66 g (1 mole) of cholesterol and 265.19 g (1 mole) of 11-bromoundecanoic acid were dissolved in 200 ml of toluene. The resulting solution was introduced into a 1 L three-neck flask on which a condenser and a Dean-Stark trap were equipped. After 2 g of sulfuric acid as a catalyst was added, the mixture was slowly heated to reflux the toluene while removing water produced during the reaction. The reaction proceeded continuously until water was no longer produced, and then toluene was removed under reduced pressure. The reaction product was recrystallized from acetone to obtain cholesteryl-11-bromoundecanoate in the form of white powder: Yield 95%.

EXAMPLE 2

79.6 g (0.5 mole) of N,N'-dimethylaminoethyl methacrylate and 262.3 g (0.5 mole) of the cholesteryl-11-bromoundecanoate prepared in Example 1 were mixed in a 500 ml one-neck flask and were dissolved by adding 200 ml of acetonitrile as the reaction solvent under heating. To the resulting solution was added 10 mg of hydroquinone. The reaction proceeded for about 48 hours while refluxing the reaction solvent. After the reaction was completed, the solvent was removed under reduced pressure to obtain the impure reaction product which was then dissolved in trichloromethane and separated and purified through a silica gel column using a mixture of trichloromethane and ethanol (4:1) as eluant to obtain (N,N'-dimethyl-N"-cholesteryl undecanoyl) aminoethyl methacrylate in a yield of 40%.

EXAMPLE 3

71.5 g (0.5 mole) of N,N'-dimethylaminoethyl acrylate and 262.3 g (0.5 mole) of the cholesteryl-11-bromoundecanoate intermediate prepared in Example 1 were mixed in a 500 ml one-neck flask and were dissolved by adding 200 ml of acetonitrile as the reaction solvent. To the resulting solution was added 10 mg of hydroquinone. The reaction was carried out for about 48 hours while refluxing the reaction solvent. After the reaction was completed, the solvent was removed under reduced pressure to obtain the impure reaction product which was then dissolved in trichloromethane and separated and purified through silica gel column using a mixture of trichloromethane and ethanol(4:1) as eluant to obtain (N,N'-dimethyl-N"-cholesteryl undecanoyl) aminoethyl acrylate in the yield of 48%.

EXAMPLE 4

85.5 g (0.5 mole) of N,N'-dimethylaminoethyl acrylate and 262.3 g (0.5 mole) of the cholesteryl-11-bromoundecanoate intermediate prepared in Example 1 were mixed in a 500 ml one-neck flask and were dissolved by adding 200 ml of a mixture of acetonitrile and tetrahydrofuran(1:1) as the reaction solvent. To the resulting solution was added 10 mg of hydroquinone and then the reaction was carried out for about 48 hours while refluxing the reaction solvent. After the reaction was completed, the solvent was removed under reduced pressure to obtain the impure reaction product which was then dissolved in trichloromethane and separated and purified through a silica gel column using a mixture of trichloromethane and ethanol (4:1) as eluant to obtain (N,N'-dimethyl-N"-cholesteryl undecanoyl) aminoethyl acrylate in the yield of 30%.

EXAMPLE 5

85.0 g (0.5 mole) of N,N'-dimethylaminoethyl-2-methoxypropenoate and 262.3 g (0.5 mole) of the cholesteryl-11-bromoundecanoate intermediate prepared in Example 1 were mixed in a 500 ml one-neck flask and were dissolved by adding 200 ml of a mixture of acetonitrile and tetrahydrofuran(1:1) as the reaction solvent. To the resulting solution was added 10 mg of hydroquinone and the reaction was carried out for about 48 hours while refluxing the reaction solution. After the reaction was completed, the solvent was removed under reduced pressure to obtain the impure reaction product which was then dissolved in trichloromethane and separated and purified through silica gel column using a mixture of trichloromethane and ethanol(4:1) as eluant to obtain (N,N'-dimethyl-N"-cholesteryl undecanoyl) aminoethyl-2-methoxy propenoate in the yield of 30%.

EXAMPLE 6

Following the procedure substantially identical to that of Example 5 except that N,N'-dimethylaminoethyl-2-thiomethylpropenoate 5 was used instead of N,N'-dimethylaminoethyl-2-methoxy-propenoate, (N,N'-dimethyl-N"-cholesteryl undecanoyl) aminoethyl-2-thiomethylpropenoate was obtained in the yield of 30%

EXAMPLE 7

500 mg of (N,N'-dimethyl-N"-cholesteryl undecanoyl) aminoethyl methacrylate prepared in Example 2 was dissolved in 10 g of water and then introduced into a quartz-made cell to which UV light in the intensity of 70 mJ/cm$^2$ was radiated for 2 hours at 254 nm to induce the light polymerization. After completion of polymerization, water was completely removed to obtain the desired product as a white powder. The resulting product thus obtained was dissolved in trichloromethane and then subjected to GPC to determine the molecular weight of the product. The molecular weight was determined as Mn=50,000.

EXAMPLE 8

500 mg of (N,N'-dimethyl-N"-cholesteryl undecanoyl) aminoethyl acrylate prepared in Example 3 was dissolved in 10 g of water and then subjected to sonication for 10 minutes to obtain an intimate dispersion, which was polymerized under light according to the same method as Example 7 to obtain a polymer product. As a result of GPC, the molecular weight Mn of the polymer product was determined as 45,000.

EXAMPLE 9

500 mg of (N,N'-dimethyl-N"-cholesteryl undecanoyl) aminoethyl acrylate prepared in Example 4 was dispersed thoroughly in 10 g of water by means of sonication and then polymerized under light according to the same method as Example 7 to obtain a polymer product. As a result of GPC, the molecular weight Mn of the polymer product was determined as 30,000.

EXAMPLE 10

500 mg of (N,N'-dimethyl-N"-cholesteryl undecanoyl) aminoethyl-2-methoxy-propenoate prepared in Example 5 was dispersed thoroughly in 10 g of water by means of sonication and then polymerized under UV light according to the same method as Example 7 to obtain a polymer product as a powder. As a result of GPC, the molecular weight Mn of the polymer product was determined as 50,000.

EXAMPLE 11

According to the procedure substantially identical to that of Example 10 except that the (N,N'-dimethyl-N"-cholesteryl undecanoyl) aminoethyl-2-thiomethylpropenoate prepared in Example 6 was used instead of the monomer prepared in Example 5, the desired polymer product having Mn=40,000 was obtained.

EXAMPLE 12

10 mg of cholesteric liquid crystal polymer prepared in Example 7 was thoroughly dispersed in 1 g of water. The resulting dispersion was spin-coated onto two glass plates coated with ITO and then heated at 110° C. to remove water to form a polymer layer having a thickness of about 100 Å. From the upper and lower glass plates, each of which was coated with the polymer layer, the liquid crystal cell having a thickness of 10 μm was prepared using a 10 μm spacer. The edge of the prepared liquid crystal cell was sealed only with an epoxy adhesive, except for the hole to be injected with the liquid crystal.

80 wt % of E48 liquid crystal having nematic phase(Merck) was mixed with 20 wt % of urethane-based diacrylate monomer and then 0.001 wt % (with respect to monomer) of a light curing catalyst Darocure was added thereto.

The resulting mixture was injected into a liquid crystal cell as previously prepared above. After the completion of injection, a UV light having 254 nm was radiated for 10 minutes to polymerize the urethane-based diacrylate monomer. Here, the light intensity was 500 mJ/cm$^2$. The properties of the prepared liquid crystal cell were determined according to the methods conventionally used in this technical field. The results thereof are described in Table 1 which follows, wherein the comparative Example 1 relates to a cell of which the ITO glass surface is not doped with a cholesteric liquid crystal polymer.

EXAMPLE 13

A cell was prepared according to the procedure substantially identical to that of Example 12 except that the liquid crystal polymer prepared in Example 8 was used to coat the glass plates. After injection of liquid crystal, the properties of the prepared cell were measured and described in the following Table 1.

EXAMPLE 14

A cell was prepared according to the procedure substantially identical to that of Example 12 except that the liquid crystal polymer prepared in Example 9 was used to coat the glass plates. After injection of liquid crystal, the properties of the prepared cell were measured and described in the following Table 1.

EXAMPLE 15

10 mg of the cholesteric liquid crystal polymer prepared in Example 7 was dispersed in 1 g of water and then spin-coated on the ITO glass plates to obtain a membrane having a thickness of 250 μm. Thereafter, a cell was prepared according to the same method as Example 12. After injection of liquid crystal, the properties of the prepared cell were measured and described in the following Table 1.

EXAMPLE 16

A cell was prepared according to the procedure substantially identical to that of Example 12 except that the thickness of the liquid crystal polymer layer was 500 Å. The properties of the prepared cell are described in the following Table 1.

EXAMPLE 17

A cell was prepared according to the procedure substantially identical to that of Example 12 except that the thickness of the liquid crystal polymer layer was 1000 Å. The properties of the prepared cell are described in the following Table 1.

TABLE 1

| | Properties of liquid crystal cells | | | |
|---|---|---|---|---|
| Examples | Liquid crystal polymer coating thickness (Å) | Contrast | Driving Voltage (V) | Response Time (ms) |
| Comparative Example 1 | 0 | 40:1 | 20 | 35 |
| Example 12 | 100 | 80:1 | 5.60 | 19 |
| Example 13 | 100 | 90:1 | 7.00 | 20 |
| Example 14 | 100 | 70:1 | 6.00 | 20 |
| Example 15 | 250 | 100:1 | 6.00 | 20 |
| Example 16 | 500 | 130:1 | 7.00 | 22 |
| Example 17 | 1000 | 250:1 | 9.00 | 25 |

Changes in the construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A polymer dispersed liquid crystal display device comprising two glass substrate plates, arranged to form a cell having a space therebetween, each plate loaded with a transparent electrode and coated with a cholesteric liquid crystal having the general formula (II):

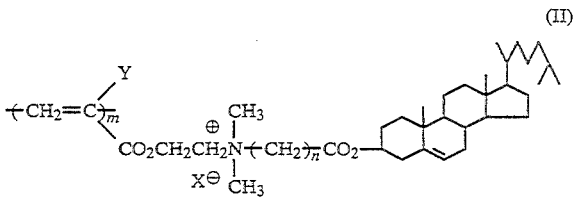

wherein
  Y represents hydrogen, a hydrocarbon radical having one or more carbon atoms, and optionally containing one or more hetero atoms selected from the group consisting of oxygen, sulfur and nitrogen,
  X represents a halogen atom,
  n denotes an integer of one or more, and
  m denotes an integer from 10–200, in a thickness of 50–1,000, the space between said two glass substrate plates having a nematic liquid crystal and polymer gel precursor therein.

2. Method of preparing a liquid crystal display device, which comprises coating surfaces of two glass substrates plates each loaded with a transparent electrode with the cholesteric liquid crystal of claim 1 in a thickness of 50–1000 Å, injecting a nematic liquid crystal and a polymer gel precursor into a space formed between the two glass plates, and subjecting the same to polymerization.

3. Method according to claim 2, wherein the polymerization is effected by ultraviolet radiation.

4. The liquid crystal display device produced by the method of claim 2.

5. The polymer dispersed liquid crystal display device of claim 1 wherein said cholesteric liquid crystal is the ethylenic addition polymer of (N,N'-dimethyl-N'-cholesteryl undecanoyl) aminoethyl methacrylate.

* * * * *